United States Patent [19]

Nakatani et al.

[11] Patent Number: 5,805,237
[45] Date of Patent: Sep. 8, 1998

[54] IMAGE PROCESSING APPARATUS WITH A FUNCTION OF SUPERIMPOSING A BINARY IMAGE ON ANOTHER IMAGE

[75] Inventors: Yoshihiro Nakatani, Yokohama; Norihiro Kawahara, Tokyo, both of Japan

[73] Assignee: Canon Kabushiki Kaisha, Tokyo, Japan

[21] Appl. No.: 133,785

[22] Filed: Oct. 8, 1993

Related U.S. Application Data

[63] Continuation of Ser. No. 885,857, May 20, 1992, abandoned.

[30] Foreign Application Priority Data

May 20, 1991 [JP] Japan ................................. 3-114589
May 20, 1991 [JP] Japan ................................. 3-114592

[51] Int. Cl.[6] ............................................ H04N 5/44
[52] U.S. Cl. ........................................ 348/589; 348/584
[58] Field of Search ..................... ; 358/183; 348/589, 348/239, 584, 586, 600, 591; 395/135, 153, 157; 345/113–116; H04N 5/278, 5/265, 5/272

[56] References Cited

U.S. PATENT DOCUMENTS

| | | | |
|---|---|---|---|
| 4,591,897 | 5/1986 | Edelson | 348/589 |
| 4,855,831 | 8/1989 | Miyamoto et al. | 358/183 |
| 4,992,782 | 2/1991 | Sakamoto et al. | 358/183 |
| 4,999,709 | 3/1991 | Yamazaki et al. | 358/160 |
| 5,008,750 | 4/1991 | Gomikawa | 358/147 |
| 5,017,143 | 5/1991 | Backus et al. | 348/586 |

FOREIGN PATENT DOCUMENTS

| | | | |
|---|---|---|---|
| 1-176172 | 7/1989 | Japan | H04N 5/278 |
| 2244987 | 9/1990 | Japan | H04N 5/278 |

*Primary Examiner*—John K. Peng
*Assistant Examiner*—Nathan J. Flynn
*Attorney, Agent, or Firm*—Fitzpatrick, Cella, Harper & Scinto

[57] ABSTRACT

A binary image multiplexing apparatus of the present invention includes a plurality of storage areas and divides a binary image signal corresponding to a binary image into a plurality of blocks respectively corresponding to the plurality of storage areas, to store the divided blocks in the storage areas. The binary image signal corresponding to at least one of the storage areas is selectively read out and is superimposed on an input image signal corresponding to the input image, so that the binary image signal can be superimposed on the input image signal, without overlapping, by means of a simple structure.

17 Claims, 7 Drawing Sheets

IMAGE PROCESSING APPARATUS WITH A FUNCTION OF SUPERIMPOSING A BINARY IMAGE ON ANOTHER IMAGE

This application is a continuation of application Ser. No. 07/885,857, filed May 20, 1992, now abandoned.

BACKGROUND OF THE INVENTION

1. Field of the Invention

The present invention relates to an image signal processing system capable of superimposing information signal corresponding to characters or symbols on an image signal.

2. Related Background Art

In the conventional image signal processing system capable of superimposing an information signal corresponding to characters or symbols on an image signal, there has been employed, for example, in camcorders, a digital superimpose device which binzarizes an image signal, such as of a title image, to be superimposed, stores thus binzarized image signal in a memory, then reads said signal from said memory, converts the signal into an image signal of a desired color and superimposes the signal on an image signal generated in a video camera unit by exposure to an image (phototaking) or supplied from an external device.

In such digital superimpose device, the memory for (storing the image signal for example of a title image to be superimposed) is utilized with a minimum unit of binary image signal of a picture frame for controlling the write-in or read-out of the binary image signal.

The superimposed display is achieved by converting the binary image signal, read from the memory, into a title image signal of a predetermined color and selectively switching between the input image signal and the title image signal.

There is also utilized a display with a see-through effect in which the input image can be seen through the superimposed title image, by adding the luminance signal only of the input image to the image signal obtained by superimposing the title image signal of predetermined color on the input image signal.

In the present specification, such display will be called the see-through display mode.

The above-mentioned conventional digital superimpose device has been associated with a drawback that the input image is hidden by the title image and thus becomes difficult to comprehend, particularly if such title image occupies a significant area in the picture frame.

On the other hand, the above-mentioned see-through display mode is also associated with a drawback of requiring a complex circuit configuration, since there is required an adding circuit for adding the luminance signal of the input image to the input image signal on which the title image signal is superimposed.

Also, for superimposing title images of two picture frames on the photographic image signal, there is employed a method of storing the title image signals of said two picture frames in memories and superimposing the image signals by simultaneously reading said title image signals of two picture frames from the memories. In this case, in an area where the two title images to be superimposed mutually overlap, one or the other of the title images is preferentially displayed on the monitor.

Such title displaying method will be called the overlapping display mode.

In a case where such overlapping display mode is used in the conventional digital superimpose device, there is required a complex operation since it is necessary to designate which of the two title images is to be given priority in the display.

Also, in order to prevent the overlapping of two title images, it is necessary to set the write-in addresses, at the storage of the title image signals of two picture frames in the memory, in such a manner that the binary image signals, corresponding to said title images of two picture frames, do not mutually overlap in said memory, and the write-in control of the memory therefore inevitably becomes complex.

SUMMARY OF THE INVENTION

An object of the present invention is to provide an image signal processing system capable of resolving the above-mentioned drawbacks.

Another object of the present invention is to provide an image signal processing system capable of superimposing a binary image on an input image without mutual overlapping.

The above-mentioned objects can be attained, according to an embodiment of the present invention, by an image signal processing system comprising:

memory means for storing a binary image signal, corresponding to a binary image, in a form divided into plural blocks;

binary image signal output means for reading and releasing the binary image signal, dividedly stored in plural blocks in said memory means, independently for each block; and multiplexing means for multiplexing the binary image signal, released from the binary image signal output means, with an input image signal corresponding to the input image.

Still another object of the present invention is to provide an image signal processing system capable of superimposing plural binary images on an input image, without mutual overlapping of the plural binary images.

The above-mentioned object can be attained, according to an embodiment of the present invention, by an image signal processing system comprising:

memory means for storing a binary image signal, corresponding to a binary image, in a form divided in plural blocks;

binary image signal output means for reading and releasing the binary image signal, stored in plural divided blocks in the memory means, in mutually different timings for different blocks; and multiplexing means for multiplexing the binary image signal, released from said two-valued image signal output means, with an input image signal corresponding to the input image.

Still other objects of the present invention, and the advantages thereof, will become fully apparent from the following detailed description of the preferred embodiments, taken in conjunction with the accompanying drawings.

DETAILED DESCRIPTION OF THE PREFERRED EMBODIMENTS

Now the present invention will be clarified in detail by description of the preferred embodiments thereof.

Figure 1:
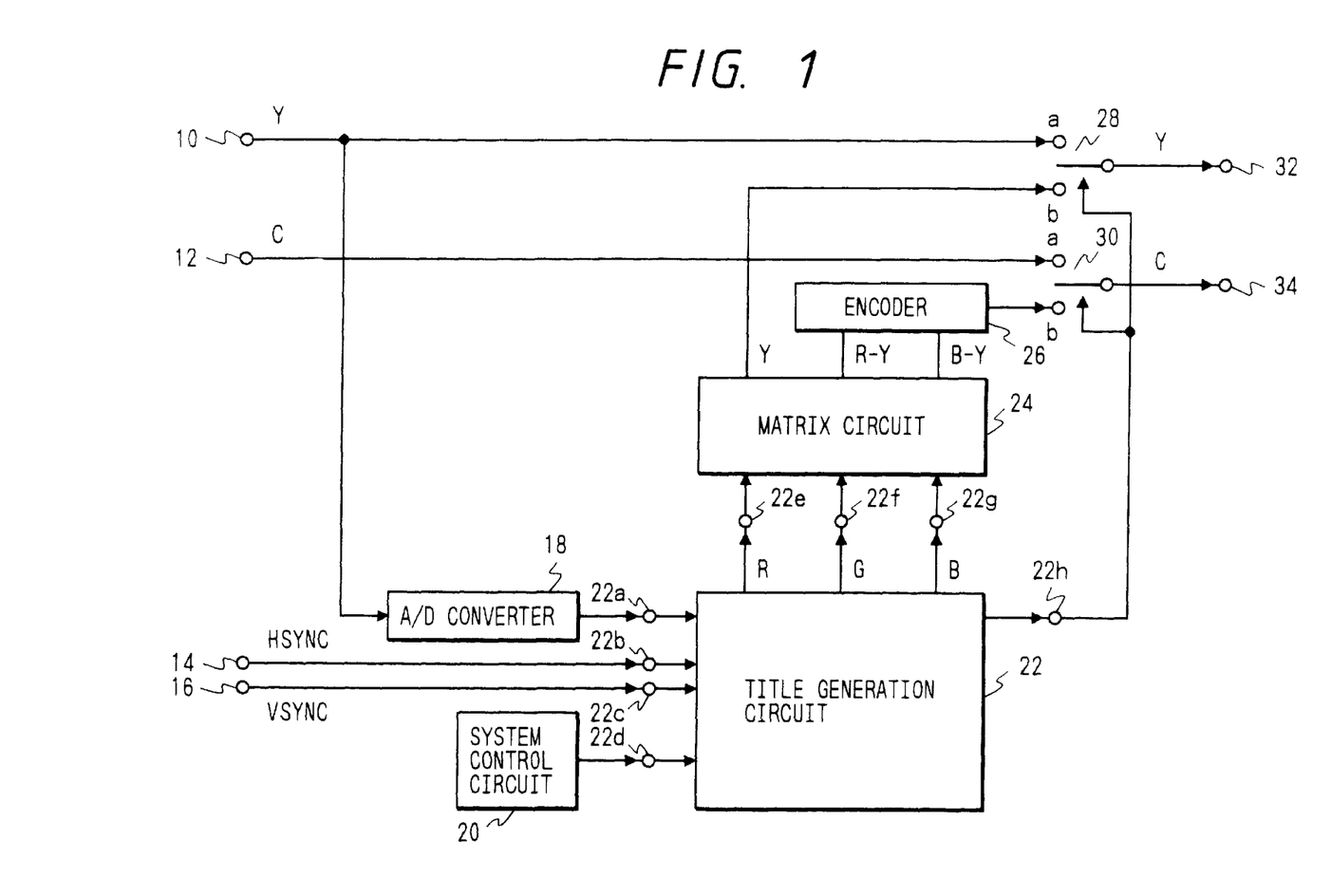
FIG. 1 is a block diagram of a digital superimpose device provided with a title generation circuit.
Figure 2:
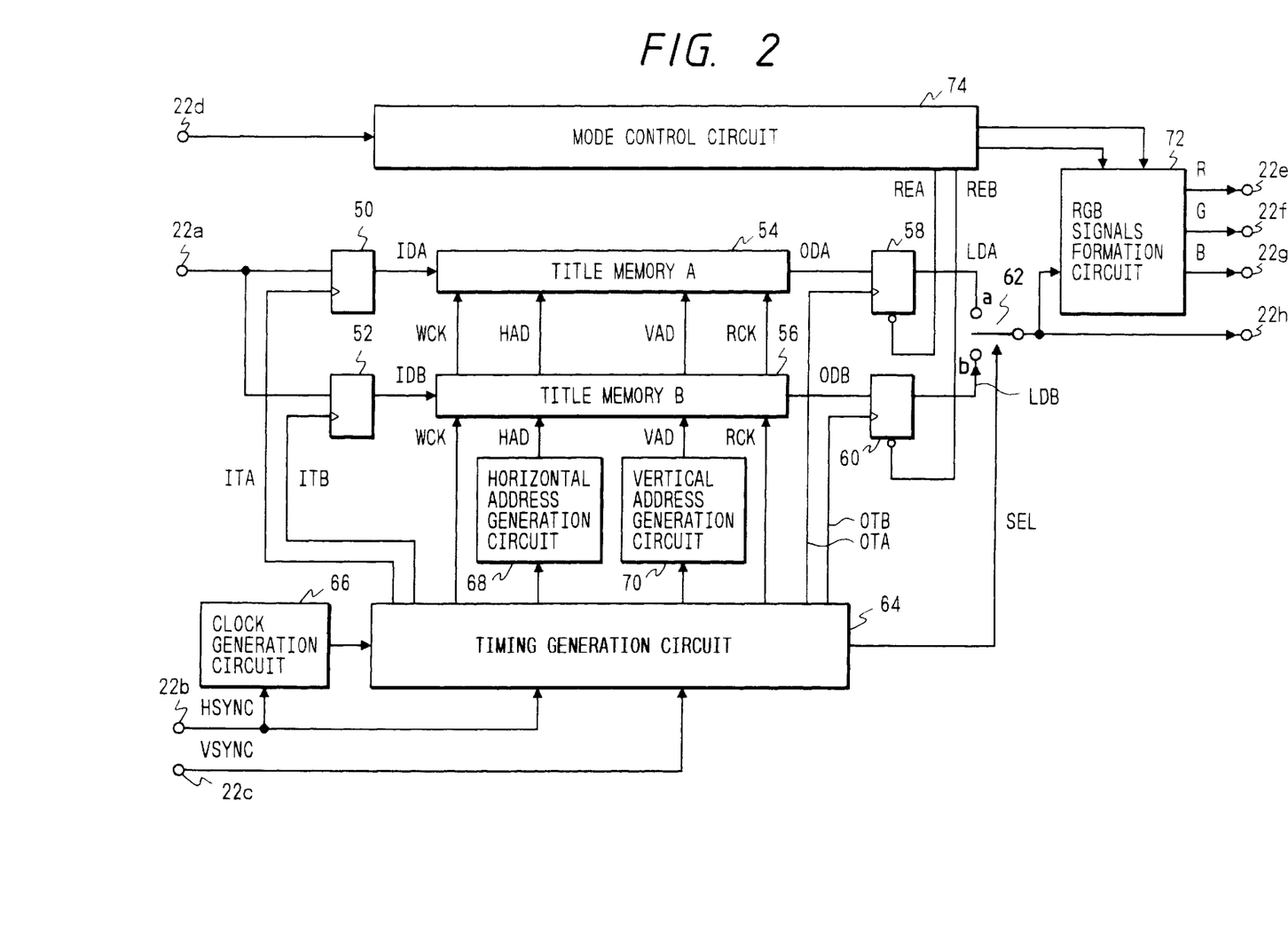
FIG. 2 is a block diagram of a title generation circuit constituting a first embodiment of the present invention.

FIG. 1 is a block diagram of a digital superimpose device provided with a title generation circuit, and FIG. 2 is a block diagram of the title generation circuit constituting a first embodiment of the present invention.

First, explanation will be given on the configuration shown in FIG. 1.

A luminance signal input terminal 10 receives a luminance signal component Y of an input image signal supplied from an unillustrated camera unit or an external device (namely an image signal corresponding to the title image, or an image signal on which the title image is to be superimposed). A color signal input terminal 12 receives a color signal component C of the input image signal. A horizontal synchronization signal input terminal 14 receives a horizontal synchronization signal $H_{sync}$, while a vertical synchronization signal input terminal 16 receives a vertical synchronization signal $V_{sync}$.

An A/D converter 18 converts the luminance signal entered from the luminance signal input terminal 10 to digital (and specifically, to binary) form. A system control circuit 20 controls the function of the entire device.

A title generation circuit 22 serves to store the binary image signal corresponding to the title image, entered from the luminance signal input terminal 10 and binarized by said A/D converter 18, and to read out the thus stored binary image signal, to convert the signal input to a title image signal of a predetermined color and to release the thus-converted signal, and is provided with input terminals 22a, 22b, 22c, 22d and output terminals 22e, 22f, 22g, 22h.

A matrix circuit 24 converts the title image signal, released in the form of R, G, B signals from the title generation circuit 22, into a luminance signal Y and color difference signals R-Y, B-Y, and an encoder 26 converts the color difference signals R-Y, B-Y, released from said matrix circuit 24, into color signals by orthogonal two-phase transformation.

Switches 28, 30 are controlled according to a control signal released from the output terminal 22h of the title generation circuit 22. The switch 28 serves to select either the luminance signal from the luminance signal input terminal 10 or that supplied from the matrix circuit 24, while the switch 30 serves to select either the color signal entered from the color signal input terminal 12 or that released from the encoder 26.

There are also provided a luminance signal output terminal 32 for releasing a luminance signal containing the superimposed title image, and a color signal output terminal 34 for releasing a color signal containing the superimposed title image.

In the configuration shown in FIG. 1, an input luminance signal, corresponding to a title image and entered from the luminance signal input terminal 10, is supplied to the A/D converter 18 for no conversion, and is then supplied to the title generation circuit 22 through the input terminal 22a thereof.

The title generation circuit sets the color of the title image and sends the title image signal, stored in the memory, in the form of R, G, B signals through the output terminals 22e, 22f, 22g, 22h to the matrix circuit 24 at a timing corresponding to the superimposing position of the title image, according to the synchronization signals entered from the horizontal synchronization signal input terminal 14 and the vertical synchronization signal input terminal 16 and also according to a control signal supplied from the system control circuit 20 in response to an instruction from an unillustrated operation unit.

The matrix circuit 24 converts the R, G, B signals, supplied from said title generation circuit 22, into a luminance signal Y and color difference signals R-Y, B-Y, and the encoder 26 further converts said color difference signals into color signals by orthogonal two-phase transformation.

The system control circuit 20 designates the method of display of the title image to the title generation circuit according to the instruction in the unrepresented operation unit, and the title generation circuit 22 controls the switches 28, 30 through the output terminal 22h according to thus designated display method, whereby the title image signal is superimposed, at said switch switches 28, 30, with desired position, color and mode on the image signal entered from the luminance signal input terminal 10 and the color signal input terminal 12, and the resulting signals are released from the output terminals 32, 34.

In the following, the title generation circuit 22 shown in FIG. 1 will be explained further with reference to FIG. 2. In the following description, there will be explained a case, for the purpose of simplicity, in which the memory for storing the title image signal is divided into two blocks. In FIG. 2, components equivalent to those in FIG. 1 are represented by the same symbols and will not be explained further.

At the storage of the title image signal to be superimposed, the two-valued image signal corresponding to the title image and supplied from the A/D converter 18 shown in FIG. 1 is supplied through the input terminal 22a and D-flip-flops (D-F/F) 50, 52 and stored in title memories A (54) and B (56).

At the superimposing operation, the two-valued image signal stored in the title memories A (54) and B (56) is read respectively through D-flip-flops 58, 60 and supplied to terminals a, b of a switch 62, and the signal released from said switch 62 is supplied to an R, G, B signal formation circuit 72.

A mode control circuit 74 receives a control signal through the input terminal 22d, from the system control circuit 20 shown in FIG. 1, in response to the instruction from the unrepresented operation unit, and controls said R, G, B signal formation circuit 72 so as to form a title image signal of a color designated by the control signal, whereby the title image signal of such designated color are released from the output terminals 22e, 22f, 22g in the form of R, G, B signals.

The output signals of the above-mentioned D-flip-flops 58, 60 are respectively supplied to terminals a, b of the switch 62, of which output signal is supplied, as a switching control signal, to the switches 28, 30 shown in FIG. 1 through the output terminal 22h shown in FIG. 2.

In addition to the control of the R, G, B signal formation circuit 72 mentioned above, the mode control circuit 74 controls the signal write-in operation by sending reset signals to the D-flop-flops 58, 60 and write-in control signals to the title memories A (54) and B (56) according to the control signals supplied from the system control circuit 20 shown in FIG. 1 through the input terminal 22d.

A clock generation circuit 66 generates clock signals for supply to a timing generation circuit 64 in synchronization with the horizontal synchronization signal $H_{sync}$ entered from the input terminal 22b, and the timing generation circuit 64 generates various timing signals for supply to the clock input terminals of the D-flip-flops 50, 52, 58, 60 and the control input terminal of the switch 62, according to the clock signals and the horizontal synchronization signal $H_{sync}$ from the input terminal 22b and the vertical synchronization signal $V_{sync}$ from the input terminal 22c.

In addition, the timing generation circuit 64 supplies the title memories A (54), B (56) with write-in clock signals WCK and read-out clock signals RCK, and a horizontal address generation circuit 68 and a vertical address generation circuit 70 with timing signals.

The horizontal address generation circuit 68 and the vertical address generation circuit 70 respectively generate horizontal addresses HAD and vertical addresses VAD for supply to the title memories A (54), B (56) according to the timing signals supplied from the timing generation circuit 64, and the addresses control the superimposing position of the image signal, corresponding to the title image, on the entered image signal.

In the following there will be given an explanation on the function of the title generation circuit 22 shown in FIG. 2, with reference to a timing chart shown in FIG. 3.

For the purpose of simplicity, there will be explained, as explained above, a case in which the memory for storing the title image signal is divided into two blocks.

Figure 4:
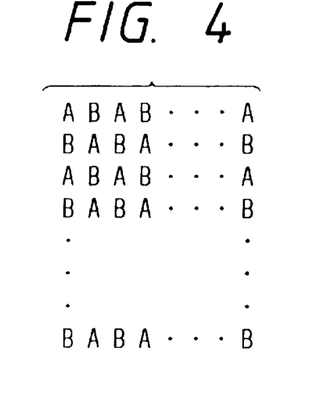
FIG. 4 is a view showing a pixel arrangement of a title image signal stored in the title memory of the title generation circuit.

Also, the pixels in each divided memory block are arranged in such a manner, as shown in FIG. 4, that the superimposing pixels of the title image are not mutually adjacent in the horizontal and vertical directions.

The binary image signal released from the A/D converter 18 shown in FIG. 1 is supplied, through the input terminal 22a, to the data input terminals of the D-flip-flops 50, 52 shown in FIG. 2.

Figure 3:
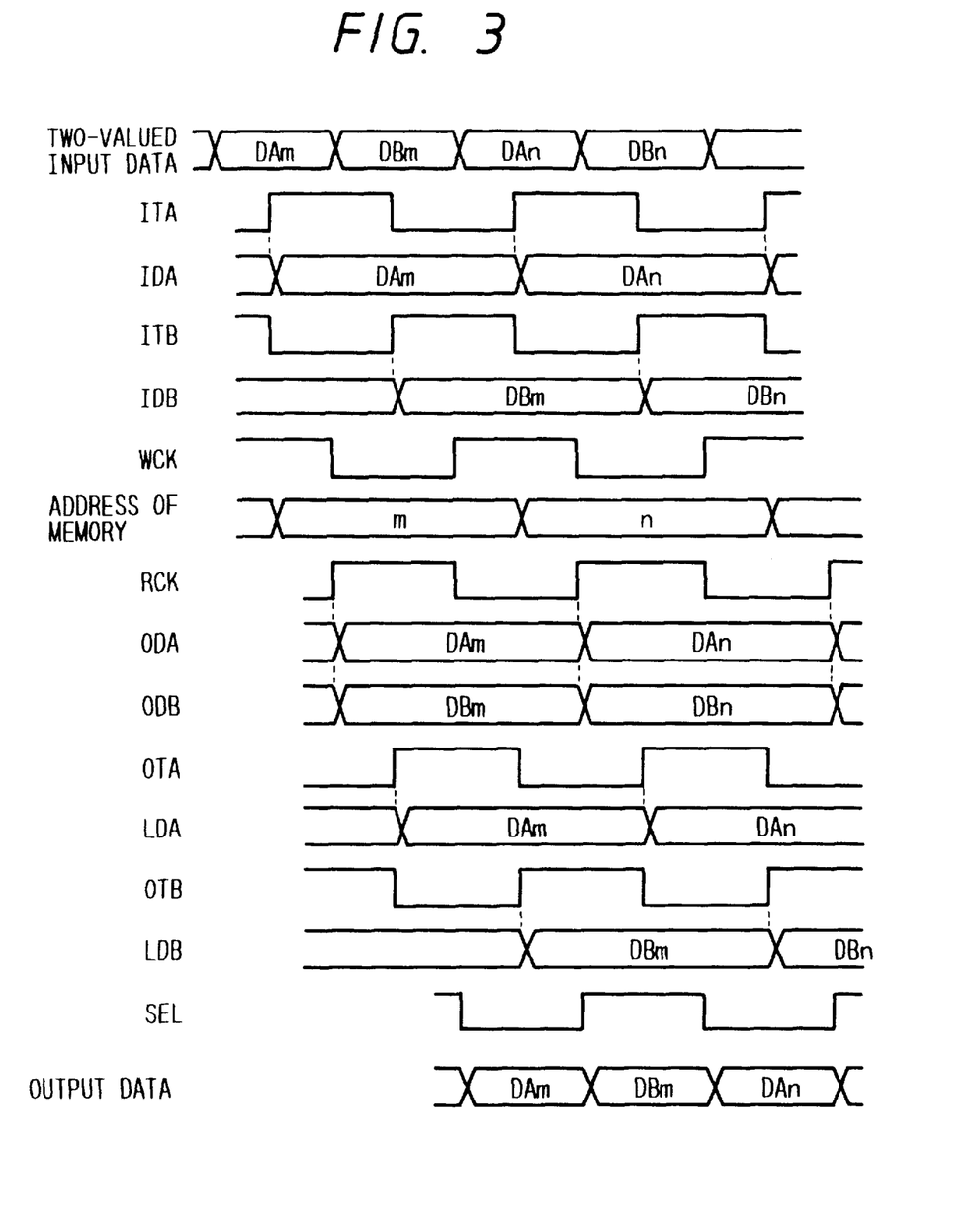
FIG. 3 is a timing chart showing the functioning of the title generation circuit shown in FIG. 2.

Also clock signals ITA, ITB shown in FIG. 3 are supplied from the timing generation circuit 64 respectively to the clock input terminals of the D-flip-flops 50, 52.

Since said clock signals ITA, ITB have mutually opposite phases, the two-valued image signals supplied from the A/D converter 18 are alternately sampled and retained by said D-flip-flops 50, 52.

Consequently the D-flip-flops 50, 52 release two-valued image signals in the respective forms IDA, IDB shown in FIG. 3, and these signals are respectively supplied to the title memories A (54), B (56) and stored therein according to an address signal and a write-in clock signal WCK shown in FIG. 3.

Thus, as shown in FIG. 3, the title memories A (54), B (56) respectively store signals DAm, DBm at an address m, and signals DAn, DBn at an address n.

As explained above, the binary image signals released from the A/D converter 18 are alternately sampled by the D-flip-flops 50, 52 and simultaneously stored in two title memories A (54), B (56).

FIG. 4 shows the arrangement of the pixels stored in the title memories A (54) and B (56), wherein A and B respectively represent pixels stored in the title memories A (54) and B (56).

As shown in FIG. 4, the pixels A and B are horizontally offset in every horizontal line, under the control of said timing generation circuit 64.

In the superimposing operation, the image data stored in the title memories A (54), B (56) are read as output data ODA, ODB in the timing shown in FIG. 3, according to the address signal and a read-out clock signal RCK, and said output data ODA, ODB are respectively supplied to the data input terminals of the D-flip-flops 58, 60.

Receiving clock signals OTA, OTB shown in FIG. 3 from the timing generation circuit 64, at the clock input terminals, the D-flip-flops 58, 60 respectively release output signals LDA, LDB shown in FIG. 3, which are respectively supplied to the terminals a, b of the switch 62.

The switch 62 is so controlled as to alternately select the signals LDA, LDB supplied to the terminals a, b by a switching control signal SE supplied from the timing generation circuit 64, thus providing output data as shown in FIG. 3.

The output data of the switch 62 are supplied to the R, G, B signal formation circuit 72, which forms the title image signal of a color designated by the control signal supplied from the system control circuit 20 shown in FIG. 1, said title image signal being released in the form of R, G, B signals from the output terminals 22e, 22f, 22g.

The output signals, in the form of R, G, B signals, are converted by the matrix circuit 24 and the encoder 26 shown in FIG. 1 into a luminance signal and color signals, which are then supplied to the terminals b of the switches 28, 30.

The output signals of the D-flip-flops 58, 60 are supplied to the terminals a, b of the switch 62, which alternately selects the signals LDA, LDB supplied to the terminals a, b according to the selecting control signal SEL supplied from the timing generation circuit 64, thereby providing output data as shown in FIG. 3.

Thus the output data from the switch 62 are restored, at the storage in the two title memories A (54), B (56), to the order of the binary data entered from the A/D converter 18 through the input terminal 22a with the pixel arrangement shown in FIG. 4.

Also the output data of the switch 62 are supplied, as a selecting control signal, to the switches 28, 30 shown in FIG. 1 through the output terminal 22h. When the output data are at the H-level, the switches 28, 30 are connected to the terminals b to release the luminance and color signals corresponding to the title image signal, but the switches are otherwise connected to the terminals a to directly release the input image signal entered from the input terminals 10, 12 shown in FIG. 1.

The foregoing is the function when the title generation circuit 22 of the present embodiment is used as an ordinary title generation circuit.

However, the title generation circuit 22 of the present embodiment is so constructed as to also effect following functions.

As shown in FIG. 2, the D-flip-flops 58, 60 of the title generation circuit 22 of the present embodiment are provided with reset terminals, which can be given a reset signal from the system control circuit 20, whereby the data stored either of the title memories A (54) and B (56) can be read.

In the following there will be explained, as an example, the operation of reading only the data stored in the title memory A (54), not reading those stored in the title memory B (56).

In this case, the system control circuit 20 shown in FIG. 1 sends, to the mode control circuit 74 through the input terminal 22d, a read-out control signal for reading only the data stored in the title memory A (54).

In response, the mode control circuit 74 sends an H-level reset signal REA and an L-level reset signal REB respectively to the reset signal input terminals of the D-flip-flops 58, 60.

The D-flip-flop 60 is reset by the reset signal, whereby the output LDB from the D-flip-flop 60 assume the L-level state.

Consequently, in the periods indicated by A in FIG. 4, the title image signal formed according to the image data stored in the title memory A (54) is released, and, in the periods indicated by B in FIG. 4, the input image signal is released without change. Thus, in the superimposing of the title image on the input image, it is rendered possible to achieve such superimposing without mutual overlapping of the title image and the input image, thereby attaining an effect similar to the see-through display.

In the above-explained embodiment, the D-flip-flops 58, 60 are provided with the reset input terminals, but it is also possible to provide the title memories A (54), B (56) with read-out control terminals, to construct said title memories in such a manner that the title memory provides L-level output data when an L-level read-out control signal is supplied to said terminal, and to employ the above-mentioned reset signals REA, REB as the read-out control signals.

Figure 5:
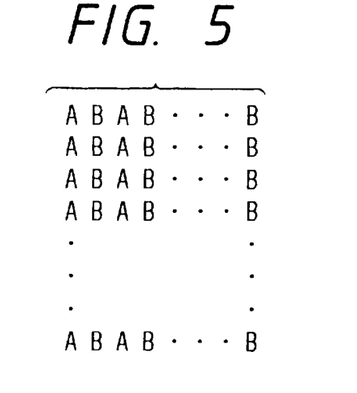
FIG. 5 is a view showing another pixel arrangement of a title image signal stored in the title memories of the title generation circuit.
Figure 6:
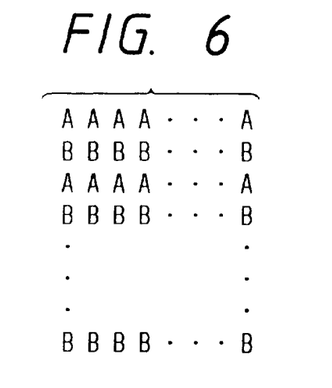
FIG. 6 is a view showing still another pixel arrangement of a title image signal stored in the title memories of the title generation circuit.

Also in the above-explained embodiment, the title memory for storing the title image signal is divided into two blocks, with the pixel arrangement shown in FIG. 4, but a similar effect can be attained with a pixel arrangement as shown in FIG. 5 or 6, by suitably varying the timing of the signals ITA, ITB, OTA, OTB released from the timing generation circuit 64.

Figure 7:
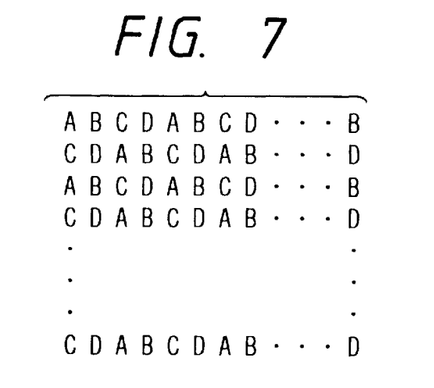
FIG. 7 is a view showing a pixel arrangement of a title image signal stored in title memories of the title generation circuit equipped with four title memories.
Figure 8:
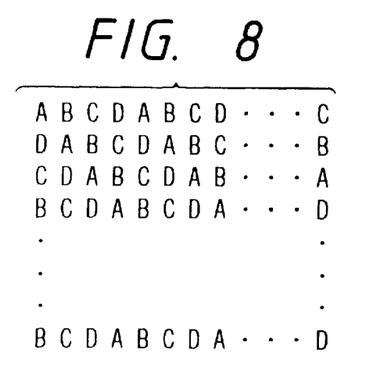
FIG. 8 is a view showing another pixel arrangement of a title image signal stored in the title memories of the title generation circuit equipped with four title memories.
Figure 9:
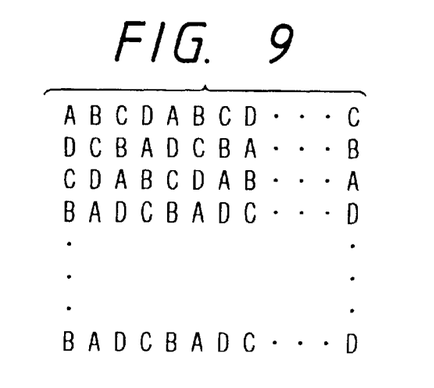
FIG. 9 is a view showing still another pixel arrangement of a title image signal stored in the title memories of the title generation circuit equipped with four title memories.

Also a similar effect can be obtained by dividing the memory for storing the title image signal into four blocks and employing a pixel arrangement as shown in FIG. 7, 8 or 9.

According to the present invention, as explained in the foregoing, it is rendered possible not only to store a title image signal corresponding to the title image of a picture frame in a memory and to superimpose the title image corresponding to thus stored title image signal on the input image corresponding to an input image signal, but also to store the title image signal in divided manner in a memory divided into plural blocks and to read the title image signal stored in one of said plural blocks for replacing the input image signal. It is thus rendered possible to superimpose the title image on the input image without mutual overlapping, and to select a suitable ratio between the title image and the input image in the superimposed image area, so that the input image remains clearly understandable even if the title image occupies a large proportion in the picture frame.

Also as explained before, the title image can be superimposed on the input image with an effect equivalent to the see-through display mode, without the addition circuit for adding the luminance signal of the input image to the input image signal on which the title image is superimposed.

Figure 10:
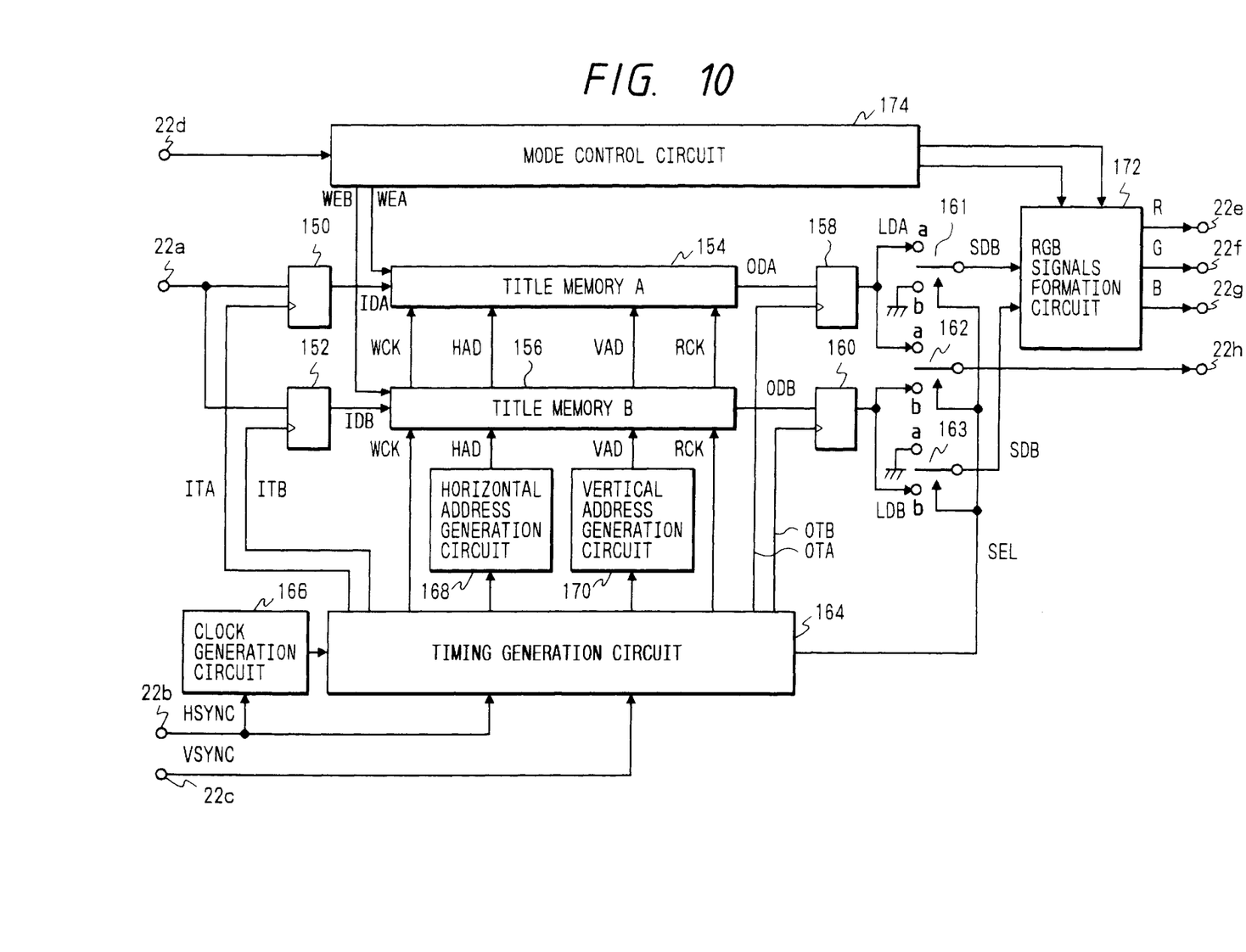
FIG. 10 is a block diagram of a title generation circuit constituting a second embodiment of the present invention.

FIG. 10 is a block diagram of a title generation circuit constituting a second embodiment of the present invention.

In the following description, there will be explained, for the purpose of simplicity, a case in which the memory for storing the title image signal is divided into two blocks.

In FIG. 10, components equivalent to those in FIG. 1 are represented by the same numbers and will not be explained further.

At the storage of the title image signal to be superimposed, a binary image signal corresponding to the title image, supplied from the A/D converter 18 shown in FIG. 1, is supplied through the input terminal 22a and D-flip-flops (D-F/F) 150, 152 and respectively stored in title memories A (154), B (156).

At the superimposing operation, the two-valued image signals stored in the title memories A (154), B (156) are supplied through D-flip-flops 158, 160 respectively to the terminal a of a switch 161 and the terminal b of a switch 163.

The terminal b of said switch 161 and the terminal a of the switch 163 are fixed at the L-level, and the output signals of said switches are supplied to an R, G, B signal formation circuit 172.

A mode control circuit 174 in FIG. 10, receiving a control signal from the system control circuit 20 through the input terminal 22d shown in FIG. 1 in response to the instruction from an unrepresented operation unit, controls said R, G, B signal formation circuit 172 so as to form the title image signal of a color designated by said control signal, whereby the title image signals of said designated color in the form of R, G, B signals are released from the output terminals 22e, 22f, 22g.

On the other hand, the output signals of the aforementioned D-flip-flops 158, 160 are respectively supplied to the terminals a, b of a switch 162, of which output signal is supplied, as a selecting control signal, to the switches 28, 30 shown in FIG. 1, through the output terminal 22h shown in FIG. 10.

In addition to the above-mentioned control of the R, G, B signal formation circuit 172, the mode control circuit 174 controls the write-in operation of the title memories A (154), B (156) by supplying write-in control signals thereto, according to a control signal supplied from the system control circuit 20 shown in FIG. 1, through the input terminal 22d.

A clock generation circuit 166 generates, in synchronization with the horizontal synchronization signal $H_{sync}$ entered from the input terminal 22b, clock signals for supply to a timing generation circuit 164, which generates various timing signals for supply to the clock input terminals of the D-flip-flops 150, 152, 158, 160 and the control input terminals of the switches 161, 162, 163, according to said clock signals, the horizontal synchronization signal $H_{sync}$ entered from said input terminal 22b and the vertical synchronization signal $V_{sync}$ entered from the input terminal 22c.

In addition, the timing generation circuit 164 supplies the title memories A (154), B (156) with write-in clock signals WCK and read-out clock signals RCK, and a horizontal address generation circuit 168 and a vertical address generation circuit 170 with timing signals.

According to the timing signals supplied from the timing generation circuit 164, the horizontal address generation circuit 168 and the vertical address generation circuit 170 respectively generate horizontal addresses HAD and vertical addresses VAD for supply to the title memories A (154), B (156), and the superimposed position of the image signal, corresponding to the title image, on the input image signal is controlled by said addresses.

The function of the title generation circuit 22 shown in FIG. 10 will be explained in the following, with reference to a timing chart shown in FIG. 11.

For the purpose of simplicity, as mentioned before, there will be explained a case in which the memory for storing the title image signal is divided into two blocks.

The binary image signal, released from the A/D converter 18 shown in FIG. 1, is supplied, through the input terminal 22a, to the data input terminals of the D-flip-flops 150, 152 shown in FIG. 10.

Figure 11:
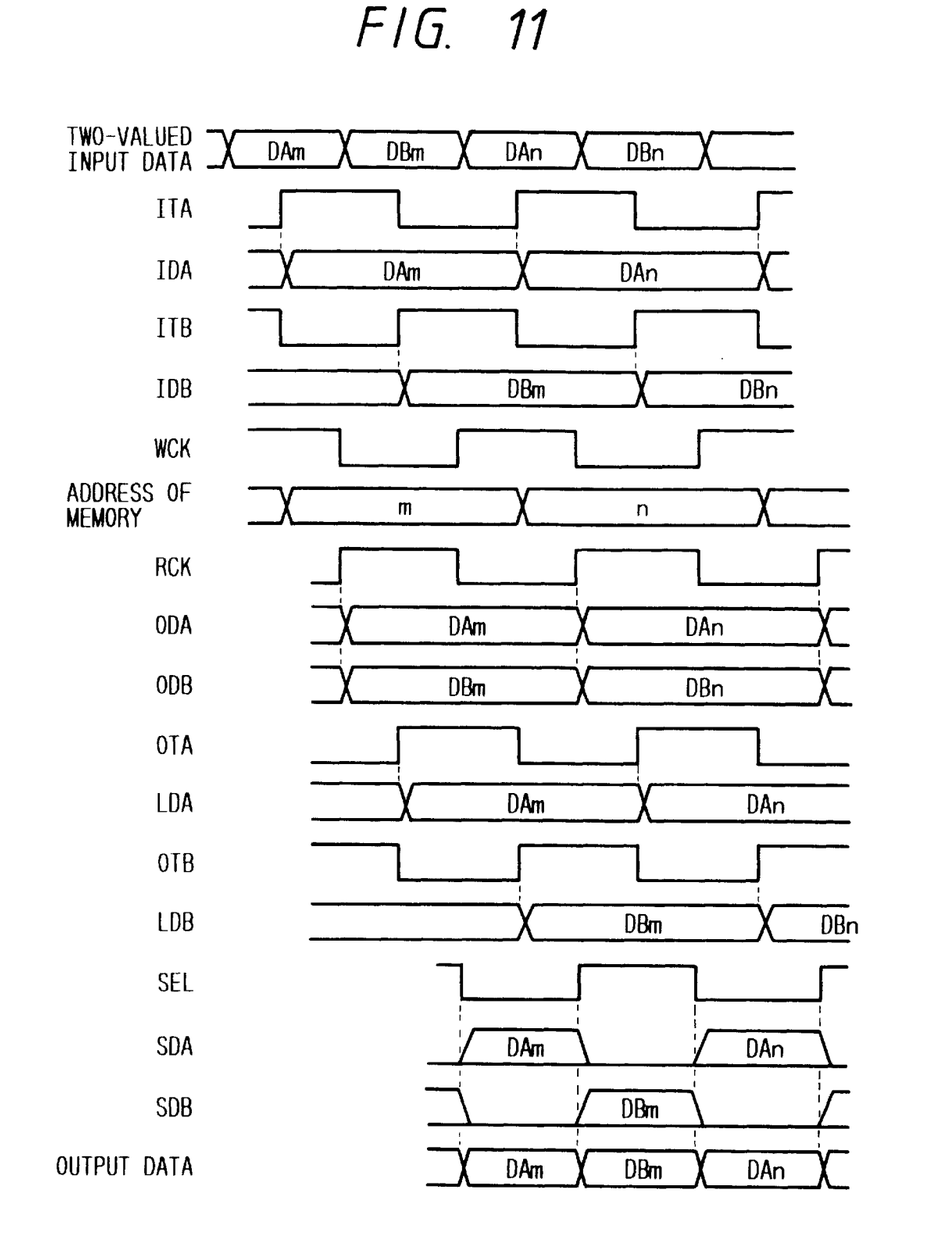
FIG. 11 is a timing chart showing the functioning of the title generation circuit shown in FIG. 10.

The clock input terminals of said D-flip-flops 150, 152 respectively receive clock signals ITA, ITB shown in FIG. 11, from the timing generation circuit 164.

Since the clock signals ITA, ITB are mutually inverted in phase, the binary image signal from the A/D converter 18 is alternately sampled and retained by said D-flip-flops 150, 152.

Consequently the D-flip-flops 150, 152 respectively provide binary image signals IDA, IDB shown in FIG. 11, and the signals are supplied to and stored in the title memories A (154), B (156) according to the address signal and the write-in clock signals WCK shown in FIG. 11.

Thus the title memories A (154), B (156) respectively stored signals DAm, DBm at an address m, and signals DAn, DBn at an address n, as shown in FIG. 11.

As explained above, the binary image signal released from the A/D converter 18 is alternately sampled by the D-flip-flops 150, 152 and simultaneously stored in the two title memories A (154), B (156).

FIG. 5 shows the arrangement of pixels stored in the title memories, wherein A and B respectively represent the pixels stored in the title memory A (154) and those stored in the title memory B (156).

Also the control method by the timing generation circuit 164 may be so modified that the pixels A and B are horizontally offset in every horizontal line, as shown in FIG. 4.

In the superimposing operation, the image data stored in the title memories A (154), B (156) are read as output data ODA, ODB in the timing shown in FIG. 11, according to the address signal and the read-out clock signal RCK, and the output data ODA, ODB are respectively supplied to the data input terminals of the D-flip-flops 158, 160.

Receiving clock signals OTA, OTB shown in FIG. 11 from the timing generation circuit 164 at the clock input terminals, the D-flip-flops 158, 160 respectively release output signals LDA, LDB shown in FIG. 11, which are respectively supplied to the terminal a of the switch 161 and the terminal b of the switch 163.

The switches 161, 163, being controlled by a selection control signal SEL supplied from the timing generation circuit 164, respectively provide output signals SDA, SDB shown in FIG. 11.

The output signals of the switches 161, 163 are both supplied to the R, G, B signal formation circuit 172 which generates a signal synthesized from two title image signals and corresponding to a color, designated by a control signal supplied from the system control circuit 20 shown in FIG. 1, in the form of R, G, B signals from the output terminals 22e, 22f, 22g.

The R, G, B output signals mentioned above are converted in the matrix circuit 24 and the encoder 26 shown in FIG. 1 into a luminance signal and a color signal, which are respectively supplied to the terminals B of the switches 28, 30.

The output signals of the D-flip-flops 158, 160 are also supplied to the terminals a, b of the switch 162, which alternately selects the signals LDA, LDB supplied to the terminals a, b according to the selection control signal SEL supplied from the timing generation circuit 164, thereby providing output data as shown in FIG. 11.

Thus the output data from the switch 162 are restored, at the storage in the two title memories A (154), B (156), to the order of the two-valued data entered from the A/D converter 18 through the input terminal 22a, with the pixel arrangement as shown in FIG. 5.

The output data of the switch 162 are also supplied, as a selection control signal, to the switches 28, 30 shown in FIG. 1 through the output terminal 22h. When the output data are at the H-level, the switches 28, 30 are connected to the terminals b to release the luminance and color signals corresponding to the title image signal, but the switches are otherwise connected to the terminals a to directly release the input image signal entered from the input terminals 10, 12 shown in FIG. 1.

The foregoing is the function when the title generation circuit 22 of the present embodiment is used as an ordinary title generation circuit.

However the title generation circuit 22 of the present embodiment is so constructed as to also effect following functions.

In the title generation circuit 22 of the present embodiment, the title memories A (154), B (156) are provided with write-in control signal input terminals and can be independently controlled by receiving control signals at said input terminals from the system control circuit 20.

In the following there will be explained the function in case different title image signals are stored in the two title memories A (154), B (156).

At first, at the storage of the first title image signal, the system control circuit 20 shown in FIG. 1 sends, through the input terminal 22d, a control signal to the mode control circuit 174 shown in FIG. 10, for instructing the storage of the title image signal only in the title memory A (154).

In response the mode control circuit 174 sends an H-level signal WEA to the control signal input terminal of the title memory A (154) and an L-level signal WEB to the control signal input terminal of the title memory B (156), whereby the first title image signal is stored only in the title memory A (154).

At the storage of the second title image signal, the mode control circuit 174 sends an L-level signal WEA to the control signal input terminal of the title memory A (154) and an H-level signal WEB to that of the title memory B (156), whereby the second title image signal is stored only in the title memory B (156).

At the superimposing of the title images on the input image, the different title image signals respectively stored in the title memories in the above-explained manner are read simultaneously to display the title images in the aforementioned overlapping display mode.

In this case, the title image signal stored in the title memory A (154) is read during the periods represented by A in FIG. 5, while that stored in the title memory B (156) is read during the periods represented by B, and the title image signals are released with independent colors.

Figure 12:
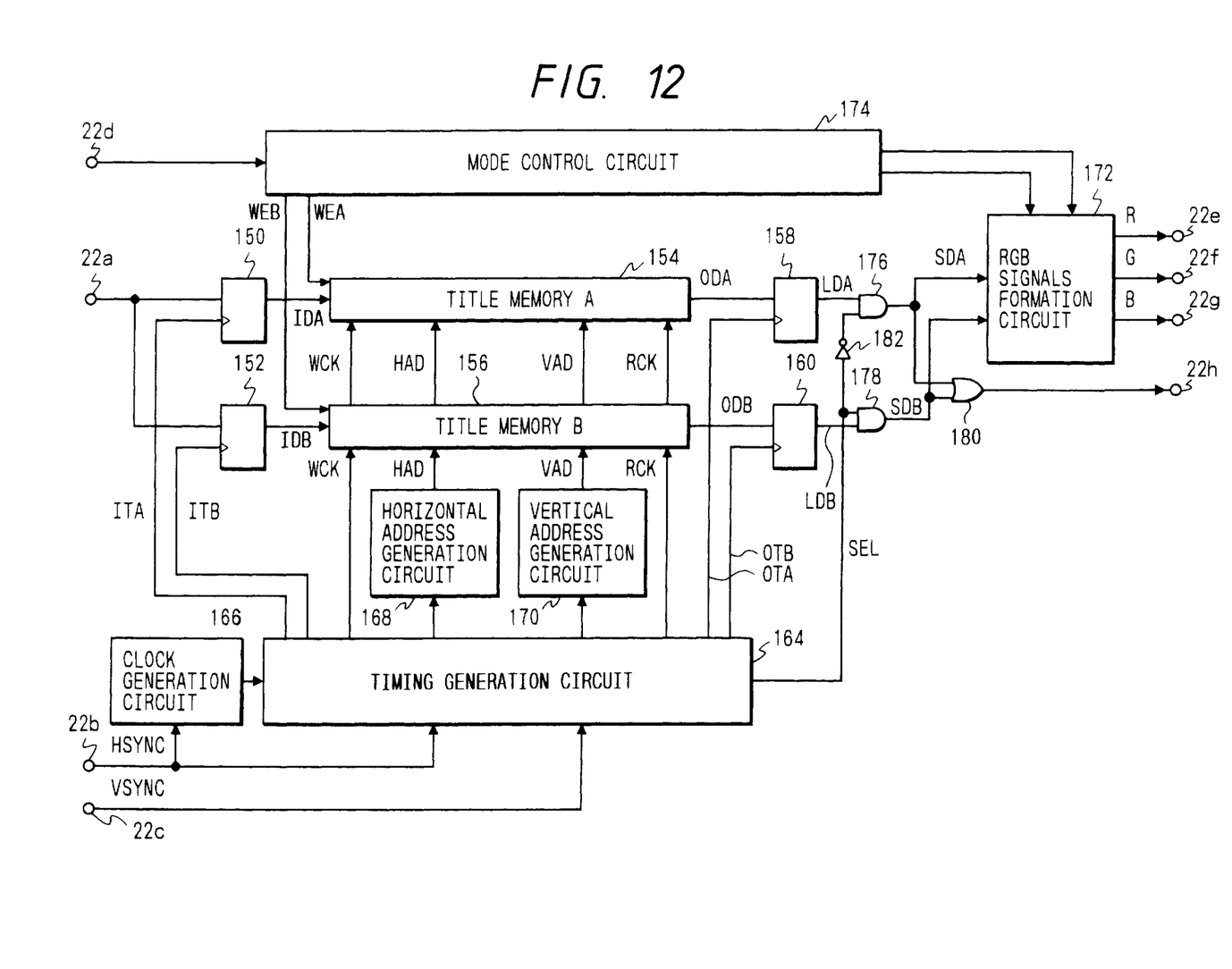
FIG. 12 is a block diagram of a title generation circuit constituting a third embodiment of the present invention.

The switches 161, 162, 163 in the above-explained embodiment may be replaced, as shown in FIG. 12, by AND gates 176, 178, an OR gate 180 and an inverter 182 to achieve a similar effect.

In the foregoing embodiment, the memory for storing the title image signal is divided into two blocks with a pixel arrangement as shown in FIG. 5, but a similar effect can be attained also by a pixel arrangement shown in FIG. 4, obtained by suitable modifying the timing of the signals ITA, ITB, OTA, OTB released from the timing generation circuit 164.

Also a similar effect can be attained by dividing the memory, for storing the title image signal, into four blocks and employing a pixel arrangement as shown in FIG. 7, 8 or 9.

According to the present embodiment, as explained in the foregoing, it is rendered possible not only to store a title image signal corresponding to the title image of a picture frame in a memory and to superimpose the title image corresponding to thus stored title image signal on the input image corresponding to an input image signal, but also to employ the memory divided into plural blocks, to store title image signals corresponding to title images of a number same as that of the blocks utilizing such memory, and to simultaneously read the title image signals stored in said memory, thereby superimposing such plural title images, without mutual overlapping, on the input image. Therefore, in the display in the aforementioned overlapping display mode, it is not necessary to designate the upper and lower relationship of the plural title images, nor to pay any particular attention to avoid mutual overlapping of plural title image signal, in their storage in the memory.

As explained in the foregoing, the present invention provides an image signal processing system capable of superimposing information signal, corresponding to characters or symbols, on the image signal with a simple structure and with simple operations.

What is claimed is:

1. An apparatus, for superimposing a binary image signal representative of a binary image whose one picture image is constructed by a plurality of pixels, on another image signal, comprising:

A) binary image signal generating means for receiving an image signal and generating a binary image signal of one picture, corresponding to the received image signal;

B) memory means having a plurality of memories and a memory space in which each of said plurality of memories is arranged so as to correspond to a different position on a display screen;

C) binary image signal storing means for storing said binary image signal generated by said binary image signal generating means by dividing said binary image signal between said plurality of memories;

D) binary image signal output means for reading out the binary image signal stored in at least one of said plurality of memories; and E) superimposing means for superimposing the binary image signal read out from at least one of said plurality of memories on an output signal corresponding to an input image.

2. An apparatus for superimposing a binary image signal representative of a binary image whose one picture image is constructed by a plurality of pixels, on another image signal, comprising:

A) binary image signal generating means for receiving an image signal and generating a binary image signal of one picture, corresponding to the received image signal;

B) memory means having a plurality of memories and a memory space in which each of said plurality of memories is arranged so as to correspond to a different position on a display screen;

C) binary image signal storing means for storing said binary image signal generated by said binary image signal generating means by dividing said binary image signal between said plurality of memories;

D) binary image signal output means for reading out said plurality of binary image signals stored in each of said plurality of memories at different timings; and E) superimposing means for superimposing the plurality of kinds of binary image signals read out by said binary image signal output means at the different timings from said plurality of memories on an input image signal corresponding to an input image.

3. A method of superimposing image information representative of an image whose one picture image is constructed by a plurality of pixels, on another image, comprising the steps of:

(a) picking up an object and generating a binary image signal of one picture, corresponding to the picked-up object image;

(b) storing said binary image signal generated by said image pickup means by dividing said binary image signal between a plurality of memories constructing a memory space in which each of said plurality of memories is arranged so as to correspond to a different position on a display screen, selecting ones of said plurality of memories and reading out the image signal stored in the selected memory to generate a first superimposition image which makes it possible to recognize an another image as a background image when said first superimposition image is superimposed on said another image, or reading out all the image signals stored in said plurality of memories to generate a second superimposition image which makes it impossible recognize said another image as the background image when said second superimposition image is superimposed on said another image; and (c) superimposing said first superimposition image or said second superimposition image on said another image.

4. A method of superimposing image information representative of an image whose one picture image is constructed by a plurality of pixels, on another image, comprising the steps of:

(a) picking up an object and generating a binary image signal of one picture, corresponding to the picked-up object image;

(b) storing said binary image signal generated by said image pickup means by dividing said binary image signal between a plurality of memories constructing a memory space in which each of said plurality of memories is arranged so as to correspond to a different position on a display screen, selecting ones of said plurality of memories and reading out the image signal stored in the selected memory to generate a first superimposition image which makes it possible to recognize an another image as a background image when said first superimposition image is superimposed on said another image, or sequentially switching between said plurality of memories and reading out the image signal stored in the switched memory to generate a second superimposition image which makes it impossible to recognize said another image as the background image when said second superimposition image is superimposed on said another image; and (c) superimposing said first superimposition image and said second superimposition image on said another image.

5. A method of superimposing image information representative of an image whose one picture image is constructed by a plurality of pixels, on another image, comprising the steps of:
   (a) picking up an object and generating a binary image signal of one picture, corresponding to the picked-up object image;
   (b) storing said binary image signal generated by said image pickup means by dividing said binary image signal between a plurality of memories constructing a memory space in which each of said plurality of memories is arranged so as to correspond to a different position on a display screen, selecting ones of said plurality of memories, and reading out the image signal from the selected memory to generate a first superimposition image which makes it possible to recognize an another image as a background image when said first superimposition image is superimposed on said another image or simultaneously reading out the image signals stored in said plurality of memories to generate a second superimposition image which makes it impossible to recognize said another image as the background image when said second superimposition image is superimposed on said another image; and
   (c) superimposing one or both of said first superimposition image and said second superimposition image on said another image.

6. An apparatus according to claim 1, further comprising transformation means for transforming the binary image signal read out by said binary image signal output means from at least one of said plurality of memories, into a binary image signal of an arbitrary color, wherein said superimposing means is so arranged as to superimpose the binary image signal transformed by said transformation means into the arbitrary color, on the output image signal.

7. An apparatus according to claim 1, wherein said memory means includes:
   a) a first memory for storing a first binary image signal corresponding to a first group of pixels among the plural pixels constituting said binary image; and
   b) a second memory for storing a second binary image signal corresponding to a second group of pixels, different from said first group, among the plural pixels constituting said binary image.

8. An apparatus according to claim 1, wherein said binary image signal includes a title image signal corresponding to a title image.

9. An apparatus according to claim 2, wherein said memory means includes:
   a) a first memory for storing a first binary image signal corresponding to a first group of pixels, among the plural pixels constituting said binary image; and
   b) a second memory for storing a second binary image signal corresponding to a second group of pixels, different from said first group, among the plural pixels constituting said binary image.

10. An apparatus according to claim 2, wherein said binary image signal includes a title image signal corresponding to a title image.

11. A method according to claim 3, further including the step of:
   converting said first superimposition image or said second superimposition image into a superimposition image of a desired color.

12. A method according to claim 3, wherein said first superimposition image and said second superimposition image are title images respectively.

13. A method according to claim 4, including the step of:
   converting said first superimposition image and said second superimposition image into superimposition images of different colors.

14. A method according to claim 4, wherein said first superimposition image and said second superimposition image are title images respectively.

15. A method according to claim 5, including the step of:
   converting said first superimposition image and said second superimposition image into superimposition images of respective desired colors.

16. A method according to claim 5, wherein said first superimposition image and said second superimposition image are title images respectively.

17. An apparatus according to claim 2, further comprising transformation means for transforming the plurality kinds of binary image signals read out by said binary image signal output means at the different timings from said plurality of memories, respectively into binary image signals of different colors, wherein said superimposing means is so arranged as to superimpose the binary image signals transformed by transformation means into the different colors for each kinds, on the input image signal.

* * * * *

UNITED STATES PATENT AND TRADEMARK OFFICE
CERTIFICATE OF CORRECTION

PATENT NO. : 5,805,237

DATED : September 8, 1998

INVENTOR(S) : YOSHIHIRO NAKATANI ET AL.

It is certified that error appears in the above-identified patent and that said Letters Patent is hereby corrected as shown below:

ON TITLE PAGE

[56] References Cited

"2244987" should read --2-244987--.

COLUMN 1 line 26,   "(storing" should read --storing-- and "for" should read --(for--; and
  line 27,   "binary" should read --a binary--.

COLUMN 3 line 27,   "description" should read --a description--.

COLUMN 4 line 15,   "no" should be deleted.

UNITED STATES PATENT AND TRADEMARK OFFICE
CERTIFICATE OF CORRECTION

PATENT NO. : 5,805,237

DATED : September 8, 1998

INVENTOR(S) : YOSHIHIRO NAKATANI ET AL.

It is certified that error appears in the above-identified patent and that said Letters Patent is hereby corrected as shown below:

COLUMN 7 line 7,  "stored" should read --stored in--; and
  line 22, "assume" should read --assumes--.

COLUMN 9 line 30, "stored" should read --store--.

COLUMN 10 line 29, "However" should read --However,--; and
  line 30, "following" should read --the following--.

COLUMN 11 line 8,  "suitable" should read --suitably--;
  line 23, "same" should read --the same--; and
  line 30, "signal," should read --signals,--.

UNITED STATES PATENT AND TRADEMARK OFFICE
CERTIFICATE OF CORRECTION

PATENT NO. : 5,805,237

DATED : September 8, 1998

INVENTOR(S) : YOSHIHIRO NAKATANI ET AL.

It is certified that error appears in the above-identified patent and that said Letters Patent is hereby corrected as shown below:

<u>COLUMN 14</u> line 39, "plurality" should read --plurality of--;
line 45, "transformation" should read --said transformation--; and
line 46, "kinds," should read --kind,--.

Signed and Sealed this

Twentieth Day of April, 1999

Attest:

Q. TODD DICKINSON

*Attesting Officer*  Acting Commissioner of Patents and Trademarks